J. E. JENNINGS.
DISTRIBUTING NOZZLE FOR BLOWER PIPES.
APPLICATION FILED NOV. 14, 1912.
1,057,738.
Patented Apr. 1, 1913.
2 SHEETS—SHEET 2.
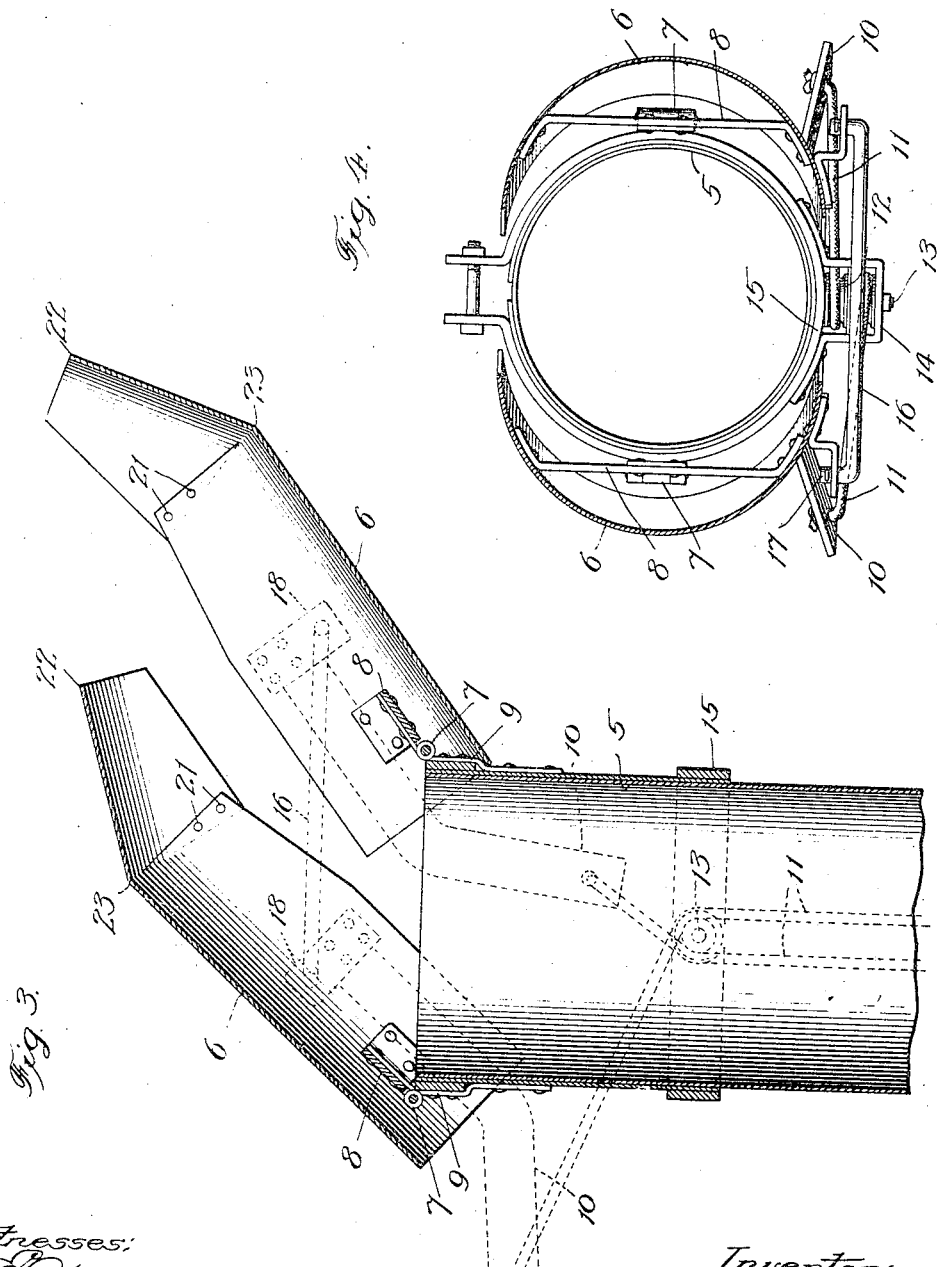

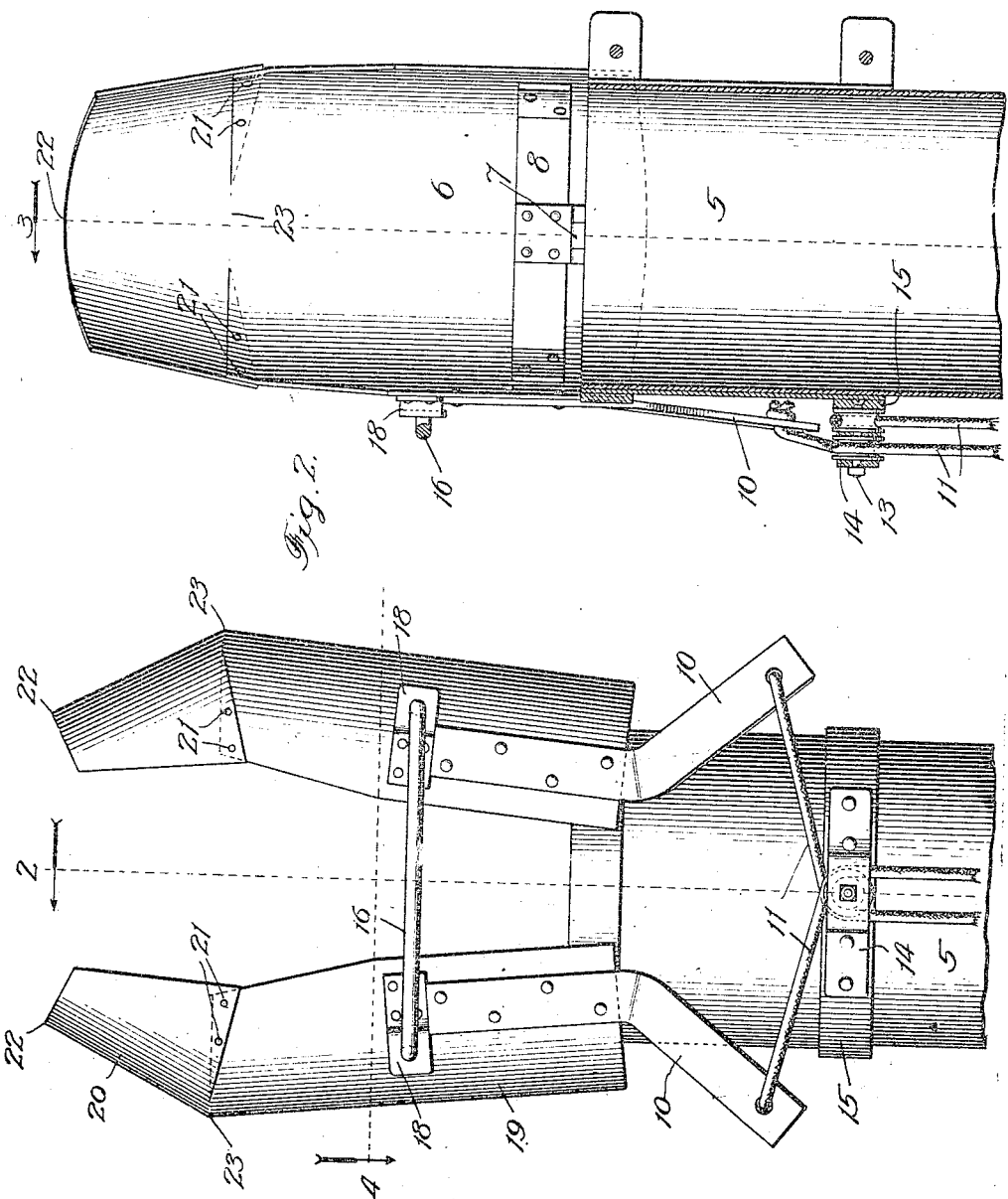

UNITED STATES PATENT OFFICE.

JAMES E. JENNINGS, OF ST. CHARLES, ILLINOIS.

DISTRIBUTING-NOZZLE FOR BLOWER-PIPES.

1,057,738.  Specification of Letters Patent.  Patented Apr. 1, 1913.

Application filed November 14, 1912. Serial No. 731,453.

*To all whom it may concern:*

Be it known that I, JAMES E. JENNINGS, a citizen of the United States, residing at St. Charles, in the county of Kane and State of Illinois, have invented a new and useful Improvement in Distributing-Nozzles for Blower-Pipes, of which the following is a specification.

My invention relates to improvements in distributing-nozzles for blower-pipes used more especially in connection with corn-husking and shredding mechanism for conveying the shredded stalks and husks away from the machine and preferably into a building for storage to be afterward used as fodder.

It is common practice among farmers, in the use of machines of the character above referred to, to discharge the shredded fodder from the husking machine through the blower-pipe into the building through a window or door thereof in which it is to be stored. The blower-pipes as hitherto provided have been so constructed as to prevent the desired distribution of the fodder over the floor of the building into which they are discharged through the blower-pipe, with the undesirable result of causing the fodder to pile up unevenly on the floor and necessitate manual labor to produce leveling of the fodder on the floor.

My object is to provide a construction of distributing-nozzle for a blower-pipe by which the material discharged through the pipe located at its discharge end in a door or window of the building to receive the material, may be directed on to any part of the floor thereof, under the control of the operator, thereby permitting the material to be evenly distributed over the floor and the above stated objections overcome.

Referring to the accompanying drawings—Figure 1 is a plan view of the discharge-end of a blower-pipe equipped with a distributing-nozzle constructed in accordance with my invention. Fig. 2 is a section taken at the line 2 on Fig. 1 and viewed in the direction of the arrow. Fig. 3 is a section taken at the line 3 on Fig. 2 and viewed in the direction of the arrow, this view showing the sections of the nozzle in the positions they assume when swung to the maximum degree to the right in Fig. 3; and Fig. 4, a section taken at the line 4 on Fig. 1 and viewed in the direction of the arrow.

At 5 is represented a blower-pipe which, in practice, would be connected with the blower, and when employed in connection with corn-husking and shredding machines would serve to convey the shredded fodder away from the machine under the action of the blower. The discharge-end of the pipe represented in the drawings is shown as equipped with a distributing-nozzle constructed in accordance with my invention, this nozzle, generally stated, comprising separate opposing members 6, pivotally connected with the pipe 5, to extend beyond the end of the latter and externally of the pipe, whereby these members may be swung back and forth on the pipe for distributing the material discharged through the pipe. The members 6 are of the same construction and form, each being preferably of semi-circular shape in cross-section and pivoted on the pipe 5 through the medium of a hinge 7, one of the sections of which is carried on a cross-rod 8 carried by the member 6 and the other section of which is secured to the pipe, as indicated at 9, the members 6 being thus pivoted at opposite sides of the pipe 5 to extend externally of the latter and spaced therefrom and project beyond the end of the pipe, whereby the members 6 are free to be swung to the right or to the left, as desired, in Fig. 3, upon their hinge-connections with the latter. Each of the members 6 is equipped with an arm 10, preferably of angle shape, as illustrated, these arms extending forwardly of the pivots 7 and each connected with a separate cable 11, which extend over pulleys 12, journaled on a shaft 13, one end of which is fixed in a yoke 14, secured to a band 15, clamped about the pipe 5, and the other end of which is secured in said band, these pulleys being located preferably intermediate the ends of the arms 10 and preferably at a point equidistant therefrom when the members 6 are in the position illustrated in Fig. 1.

It will be understood from the foregoing that by pulling on either one of the cables 11, it will act upon the arm 10 connected therewith and serve to swing it toward the pulleys with the effect of swinging the rear end of the member 6 in the opposite direction, and in order that the members 6 shall swing in unison, when either one of the cables is operated, I connect the members 6 together as through the medium of a U-shaped bar 16, the inturned arms 17 of which are journaled in offset lugs 18, secured to members 6, the distance between the pivotal connections of the arms 17 with the clips 18 being substantially the same as the distance between the pivots 7, whereby when either one of the cables 11 is drawn upon, both of the members 6 will swing in the same direction and in unison without any binding action.

In accordance with the preferred embodiment of my invention, each of the members 6 is formed of angularly-disposed sections 19 and 20, which may be provided in any suitable manner, and which, in the construction shown, are formed by slitting the sides of the members 6 transversely of their length and thereafter overlapping the free edges thus presented and securing them together in overlapping relation, as by rivets 21. It is preferred that the members 6 be secured together by the yoke 16 in such relation to each other that the distance between the extreme rear ends 22 of the sections 20 will be substantially the same as the diameter of the discharge-end 5, thus causing the rear ends of the sections 19, indicated at 23, to be spaced apart a distance considerably greater than the internal diameter of said pipe. It will be manifest that by so constructing the nozzle, the air blast and the material carried thereby, when the members 6 of the nozzle are in the position illustrated in Fig. 1, will be directed out of the nozzle substantially in line with the pipe 5. Pulling on one of the cables, as for example, the one which connects with the member 6 at the right-hand side of Fig. 3, causes both of the members 6 to swing to the right in Fig. 3 upon their pivots 7. The discharge of the wind-blast and material carried thereby from the pipe 5, against the member 6 at the left-hand side of Fig. 3, causes the material to be deflected to the right in Fig. 3 at a degree to the pipe 5, depending upon the angle at which said last-referred to member 6 extends relative to said pipe. Furthermore it will be noted that by swinging the member 6 to the right or to the left in Fig. 3, at an angle to the pipe 5, sufficiently to cause the side of one of the sections 19 to extend into the path of the air-blast and the material carried thereby, the blast and the material will impinge against and be deflected by said section, and upon encountering the section 20 coöperating therewith will be further deflected to the right or to the left, as the case may be, and thus the material may be discharged from the nozzle at a comparatively wide angle relative to the path of movement of the blast and material through the pipe 5, and by reason of the succession of deflecting surfaces provided, the discharge of the material through the nozzle is accomplished with minimum resistance.

It will be manifest that while I have shown my improved nozzle as formed of members, each of which is composed of sections angularly disposed relative to each other for the purpose above stated, the members 6, where relatively great deflection is desired, each may be formed to present a continuous curved surface extending longitudinally thereof instead of angularly disposed straight sections.

What I claim as new and desire to secure by Letters Patent is—

The combination of a blower-pipe, of a distributing-nozzle therefor formed of separate opposed members curved in cross-section, said members being pivoted to said pipe at the opposite sides of the latter and spaced therefrom and extending beyond the end of said pipe, each of said members being formed at the discharge-end of the nozzle with inwardly deflected sections, means connecting said members together for causing them to move simultaneously, and means for turning said members on their pivots, for the purpose set forth.

JAMES E. JENNINGS.

In presence of—
  JAMES E. GOODHUE,
  JAMES T. DOHERTY.